United States Patent
Heggelund et al.

(10) Patent No.: US 9,286,714 B2
(45) Date of Patent: Mar. 15, 2016

(54) APPARATUS AND METHOD FOR PROCESSING GRAPHICS PRIMITIVES

(71) Applicant: ARM LIMITED, Cambridge (GB)

(72) Inventors: Frode Heggelund, Trondheim (NO); Kenneth Edvard Ostby, Trondheim (NO)

(73) Assignee: ARM Limited, Cambridge (GB)

( * ) Notice: Subject to any disclaimer, the term of this patent is extended or adjusted under 35 U.S.C. 154(b) by 175 days.

(21) Appl. No.: 13/922,471

(22) Filed: Jun. 20, 2013

(65) Prior Publication Data

US 2014/0375637 A1    Dec. 25, 2014

(51) Int. Cl.
*G06T 15/30* (2011.01)
*G06T 11/40* (2006.01)
*G06T 15/40* (2011.01)

(52) U.S. Cl.
CPC .............. *G06T 15/40* (2013.01); *G06T 15/30* (2013.01); *G06T 2200/28* (2013.01)

(58) Field of Classification Search
CPC ................................ G06T 15/30; G06T 11/40
USPC .......................................................... 345/422
See application file for complete search history.

(56) References Cited

U.S. PATENT DOCUMENTS

| | | | |
|---|---|---|---|
| 7,292,242 B1 * | 11/2007 | Wittenbrink et al. | 345/421 |
| 8,115,783 B2 | 2/2012 | Nystad et al. | |
| 2010/0007662 A1 * | 1/2010 | Cox et al. | 345/420 |

* cited by examiner

*Primary Examiner* — Barry Drennan
*Assistant Examiner* — Shivang Patel
(74) *Attorney, Agent, or Firm* — Nixon & Vanderhye P.C.

(57) ABSTRACT

A method and apparatus includes primitive setup circuitry for determining a plurality of functions for an input graphics primitive, including an edge function associated with each edge of the input graphics primitive and a depth function associated with the input graphics primitive. Rasterization circuitry performs a rasterization operation in order to calculate position data for a plurality of graphics fragments to be used to represent the input graphics primitive. In a default mode of operation, depth bound clipping circuitry performs a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range.

11 Claims, 9 Drawing Sheets

(a), (b) + (c) ARE DEPTH EQUATIONS FOR THREE DIFFERENT PRIMITIVES

RASTERIZER BASED DEPTH BOUND TEST

| | |
|---|---|
| DEPTH EQUATION | $Z = a_z.x + b_z.y + C'_z$ |
| | $[C'_z = C_z + \text{depth\_bias}]$ |
| NEAR DEPTH PLANE EDGE EQUATION | $= a_z.x + b_z.y + C_{NEAR}$ |
| | $[C_{NEAR} = C_z - \text{near\_bound}]$ |
| FAR DEPTH PLANE EDGE EQUATION | $= -a_z.x - b_z.y - C_{FAR}$ |
| | $[C_{FAR} = C_z - \text{far\_bound}]$ |

APPARATUS AND METHOD FOR PROCESSING GRAPHICS PRIMITIVES

BACKGROUND OF THE INVENTION

1. Field of the Invention

The present invention relates to the processing of computer graphics, and in particular to an apparatus and method for processing graphics primitives in order to generate a scene for display.

2. Description of the Prior Art

When processing 3D graphics, a scene to be displayed is typically split into a number of basic components called "primitives" in order to allow the 3D graphics processing operations to be more readily carried out. The primitives are usually in the form of simple polygons, such as triangles.

Each primitive is typically defined by the vertices that make up the primitive, and each vertex will have associated with it particular data values representing the primitive at the vertex position, for example the X and Y position of the vertex, a depth (Z) value, colour and transparency values, etc. Within the graphics processing system, a primitive setup stage is performed that uses the data defined for each vertex of a given primitive in order to determine a plurality of functions for that primitive, such as edge functions that represent the geometric edges of the primitive, and a depth function used to determine a depth value at any particular point within the primitive. The primitive setup stage may also determine other functions such as interpolation functions that represent the way that the data values such as the colour values will vary across the primitive.

Following the primitive setup stage, a graphics primitive will be passed through a rasterization stage, where a rasterization operation is performed in order to determine a plurality of graphics fragments to be used to represent that graphics primitive, the rasterization operation determining the X and Y positions of each of those graphics fragments. Following rasterization, the graphics fragments are then passed through a rendering stage where the graphics fragments are subjected to colouring operations, shading operations, etc., in order to generate an output for display on a display screen.

Each graphics fragment (data element) may correspond to a single pixel (picture element) in the final display, or it can be the case that there is not a one-to-one correspondence between fragments and display pixels, for example where particular forms of post-processing such as down-scaling are carried out on the rendered image prior to displaying the final image.

In 3D graphics processing, rendering conceptually takes place within a so-called "view frustum", which is, in effect, a box in front of the viewer's position which represents the three-dimensional volume within which primitives may need to be rendered for display. The view frustum is effectively defined by having top, left, bottom and right edge planes which define a viewport representing the edges of the view frustum, and near and far depth planes which represent the front and back planes of the view frustum (representing the closest and furthest distances at which objects can appear). The viewport typically corresponds to the size of the display screen.

It is typically desirable to only render the parts of the scene that will actually be seen, i.e. are within the view frustum, and one known technique to achieve this is to "clip" primitives against the view frustum edge and depth planes prior to performing the above-described primitive setup, rasterization and rendering processes. This often requires new primitives to be geometrically generated in order to represent the part of a primitive that remains within the view frustum after the clipping process. However, such a clipping process is fairly complex and slow, and difficult to implement.

As described in commonly-owned U.S. Pat. No. 8,115, 783, the entire contents of which are hereby incorporated by reference, one known technique to try and reduce the amount of clipping required is referred to as "guard band clipping". In guard band clipping, the edge planes against which primitives are tested for clipping purposes are extended to beyond (outside) the view frustum. Whilst in some guard band arrangements, the guard band is set to a finite value such as a defined number of pixels or fragments, in an alternative arrangement the clipping area edge planes are effectively set to "infinity", thereby using an infinite guard band. Such an approach hence enables clipping to be avoided at the geometry processing stage (i.e. prior to rasterization and rendering), and instead additional steps can be taken later when processing the fragments to ensure that fragments outside the view frustum are not displayed.

When such an approach is taken in connection with the near and far depth planes of the view frustum, this means that rather than clipping primitives having vertices that are found to have depth values outside the valid depth range of the view frustum, those vertices are instead retained and those values are used when the primitive is rasterized into fragments. However, a depth bound clipping operation will later be required during processing of the graphics fragments, in order to discard graphics fragments whose associated depth value does not reside within the valid depth range of the view frustum.

However, many graphics Standards such as OpenGL and DirectX place constraints on the order in which certain processing steps must be performed. For example, both of the above Standards define that any depth bias process performed must be performed after the above depth bound clipping operation, but before the rendering process used to process the graphics fragments. Depth bias is the term used in the DirectX Standard, and the equivalent function in the OpenGL Standard is referred to as "depth offset" or "polygon offset".

Depth bias is typically enabled or disabled on a draw call by draw call basis, and hence will be enabled or disabled in respect of all of the primitives that are the subject of a particular draw call. When depth bias is enabled for a draw call, this will ensure that if a first primitive that is included within that draw call has the same depth as a second primitive which is part of a draw call that does not have depth bias enabled, the first primitive will be reproduced so that it always appears on the surface of the second primitive irrespective of the viewing angle. This effect is achieved irrespective of the order in which the first and second primitives are processed.

As another example of an ordering constraint, the depth bound clipping operation will need to be performed before any early Z-processing stage is performed to determine whether a current fragment under consideration is nearer the viewer than any previously considered fragment at the same X,Y position.

It has been found that known approaches for conforming to these ordering constraints impacts the performance and/or the area of the graphics processing system, and accordingly it would be desirable to provide an improved mechanism for performing near/far depth bound clipping which reduces the impact on performance and/or area of the graphics processing system.

SUMMARY OF THE INVENTION

Viewed from a first aspect, the present invention provides an apparatus for processing graphics primitives for display, comprising: primitive setup circuitry configured to determine a plurality of functions for an input graphics primitive, including an edge function associated with each edge of the input graphics primitive and a depth function associated with the input graphics primitive; rasterization circuitry configured to perform a rasterization operation using the edge function associated with each edge of the input graphics primitive in order to calculate position data for a plurality of graphics fragments to be used to represent the input graphics primitive; depth bound clipping circuitry configured in a default mode of operation to perform a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range; and control circuitry configured to be responsive to detection of a predetermined condition to modify the operation of the primitive setup circuitry and the rasterization circuitry for one or more input graphics primitives in order to incorporate depth bound clipping within the rasterization operation performed by the rasterization circuitry for said one or more input graphics primitives, the control circuitry further being configured on detection of said predetermined condition to disable the default mode of operation in order to disable the depth bound clipping circuitry from performing said depth bound clipping operation.

In accordance with the present invention, the apparatus can determine dynamically which circuitry to use to perform depth bound clipping, dependent upon the presence or absence of a predetermined condition, in order to improve performance and reduce area requirements of the apparatus. In particular, in the default mode of operation depth bound clipping circuitry is used to perform a depth bound clipping operation by reviewing each graphics fragment, and in particular determining whether a depth value for that graphics fragment is within a valid depth range of a view frustum. If not, the graphics fragment is discarded from further processing. However, if the depth bound clipping circuitry was to be configured so as to be able to perform the depth bound clipping operation under all conditions, this would have a significant impact on the area and power consumption of that circuitry.

To alleviate the area and power consumption requirements, in accordance with the present invention, on detection of a predetermined condition, the depth bound clipping circuitry is disabled in order to disable performance of the depth bound clipping operation by that circuitry, and instead the operation of the primitive setup circuitry and the rasterization circuitry is modified in order to incorporate depth bound clipping within the rasterization operation. Whilst this has an impact on the performance of the rasterization operation, it is an area efficient mechanism for performing depth bound clipping.

Hence, by providing the two separate mechanisms for performing depth bound clipping, and switching between those mechanisms dependent on the presence or absence of a predetermined condition, the apparatus is able to maintain high performance whilst reducing the area and power consumption requirements of the apparatus.

There are a number of ways in which the control circuitry can be configured to modify the operation of the primitive setup circuitry and the rasterization circuitry. In one embodiment, the control circuitry is configured to modify the operation of the primitive setup circuitry by causing the primitive setup circuitry to additionally determine at least one depth plane edge function for the input graphics primitive. In addition, the control circuitry is configured to modify the operation of the rasterization circuitry by causing the rasterization circuitry to incorporate said at least one depth plane edge function in said rasterization operation. By such an approach, the rasterization operation can be arranged to exclude any region of the input graphics primitive which lies outside the valid depth range as identified by said at least one depth plane edge function, so that no graphics fragments will be generated for any such region. Since no graphics fragments will be generated for any such region, there is then no need for the depth bound clipping circuitry to perform the depth bound clipping operation, the depth bound clipping having effectively been incorporated within the modified rasterization operation.

Each depth plane edge function can be determined in a variety of ways, but in one embodiment is determined using the depth function and an indication of the valid depth range of the view frustum.

In one embodiment, said at least one depth plane edge function comprises a near depth plane edge function and a far depth plane edge function. Hence, in such embodiments both depth extremities of the view frustum are represented by an associated edge function provided as an input to the rasterization circuitry.

Whilst in one embodiment the rasterization circuitry is configured, when its operation is modified by the control circuitry, to incorporate any generated depth plane edge function within the rasterization operation, in an alternative embodiment the rasterization circuitry may be configured not to incorporate said at least one depth plane edge function in the rasterization operation if the depth range of the input graphics primitive lies within the depth bound of said at least one depth plane edge function. Hence, for each input graphics primitive, a determination can be made based on the vertex information of that primitive whether there will be any portion of the input graphics primitive that will lie outside the depth bound, and if not the rasterization circuitry can be arranged not to apply the relevant depth plane edge function during the rasterization operation.

The predetermined condition that causes the control circuitry to modify the operation of the primitive setup circuitry and the rasterization circuitry for one or more input graphics primitives can take a variety of forms, but in one embodiment is a condition indicating that a depth bias is enabled for said one or more input graphics primitives. If the depth bound clipping circuitry was to be configured so as to be able to perform the depth bound clipping operation under situations where depth bias is enabled, this would have a significant impact on the area and power consumption of the apparatus due to the need to pipe the extra depth bias information through multiple parts of the apparatus to the depth bound clipping circuitry, and to provide the additional circuitry required within the depth bound clipping circuitry. By instead disabling the depth bound clipping circuitry in such situations, and incorporating depth bound clipping within the rasterization operation, a significant improvement in the area and power consumption requirements of the apparatus can be achieved.

Whilst in one embodiment depth bound clipping can be incorporated within the rasterization operation whenever depth bias is enabled, it is not essential that the apparatus is configured in this way, and in an alternative embodiment the control circuitry is configured to determine, for each input graphics primitive, whether the depth range of that input graphics primitive lies within the valid depth range of the view frustum, and only if it does not is the control circuitry then configured to modify the operation of the primitive setup circuitry and the rasterization circuitry for that input graphics primitive if the depth bias is enabled. By such an approach, situations where depth bound clipping is not required at all can be identified, and in those situations the operation of the primitive setup circuitry and rasterization circuitry is not modified even if depth bias is enabled.

Hence, if the control circuitry determines that the depth range of the input graphics primitive lies within the valid depth range of the view frustum, the control circuitry may be further configured to disable the default mode of operation in order to disable the depth bound clipping circuitry from performing said depth bound clipping operation, in addition to not modifying the operation of the primitive setup circuitry in the rasterization circuitry.

In one embodiment, the depth bound clipping circuitry is further configured to perform a depth testing operation by determining, for each graphics fragment in said plurality of graphics fragments, the depth value for said graphics fragment using the depth function, and determining with reference to a Z-buffer value maintained for the position data associated with that graphics fragment whether that graphics fragment is to be displayed.

Additionally, in one embodiment, in said default mode of operation, the depth bound clipping circuitry is configured to selectively perform the depth bound clipping operation and said depth testing operation together, so that the depth value is only calculated once per graphics fragment and then used for both said depth bound clipping operation and said depth testing operation. This provides a particularly efficient implementation by avoiding the need to calculate the depth value twice, once for depth bound clipping and once for depth testing. In one embodiment, this approach is only performed selectively, since in certain cases side-effect issues will require that the depth clipping operation is performed before shader invocation, and depth testing is performed after shader invocation. Hence, in such cases the depth bound clipping and depth testing operations must be performed separately via two passes through the depth bound clipping circuitry. In situations where cases with such side-effects occur in the presence of the earlier mentioned predetermined condition (for example when depth bias is enabled), then this separation is achieved by performing depth bound clipping within the rasterization circuitry, avoiding the need to utilize the depth bound clipping circuitry twice (in this situation the depth bound clipping circuitry just performing depth testing).

Viewed from a second aspect, the present invention provides a method of operating an apparatus to process graphics primitives for display, comprising: performing a primitive setup operation to determine a plurality of functions for an input graphics primitive, including an edge function associated with each edge of the input graphics primitive and a depth function associated with the input graphics primitive; performing a rasterization operation using the edge function associated with each edge of the input graphics primitive in order to calculate position data for a plurality of graphics fragments to be used to represent the input graphics primitive; in a default mode of operation, performing a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range; and responsive to detection of a predetermined condition, modifying the primitive setup operation and the rasterization operation for one or more input graphics primitives in order to incorporate depth bound clipping within the rasterization operation for said one or more input graphics primitives, and disabling the default mode of operation in order to disable the depth bound clipping operation.

Viewed from a third aspect, the present invention provides an apparatus for processing graphics primitives for display, comprising: primitive setup means for determining a plurality of functions for an input graphics primitive, including an edge function associated with each edge of the input graphics primitive and a depth function associated with the input graphics primitive; rasterization means for performing a rasterization operation using the edge function associated with each edge of the input graphics primitive in order to calculate position data for a plurality of graphics fragments to be used to represent the input graphics primitive; depth bound clipping means for performing, in a default mode of operation, a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range; and control means for modifying, in response to detection of a predetermined condition, the operation of the primitive setup means and the rasterization means for one or more input graphics primitives in order to incorporate depth bound clipping within the rasterization operation performed by the rasterization means for said one or more input graphics primitives, the control means further for disabling, on detection of said predetermined condition, the default mode of operation in order to disable the depth bound clipping means from performing said depth bound clipping operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
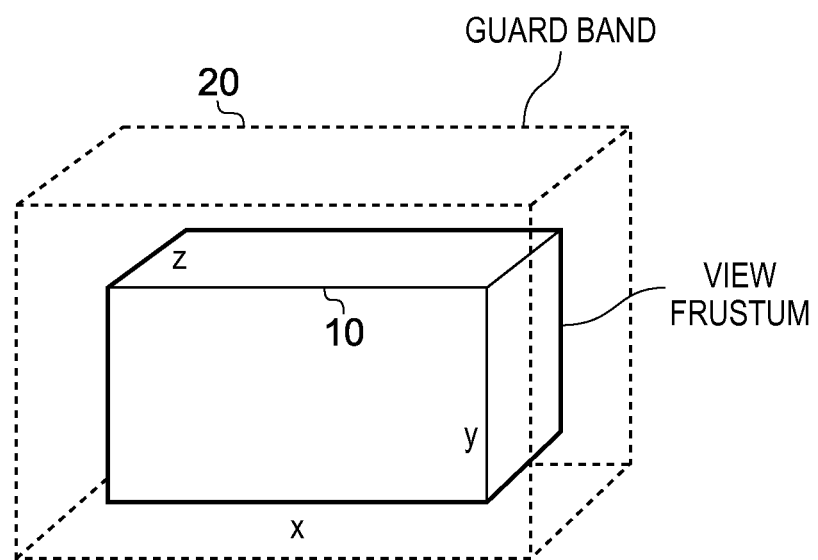
FIG. 1 schematically shows a guard band arrangement provided in association with a view frustum.

FIG. 1 schematically shows a guard band arrangement provided in association with a view frustum. The view frustum 10 represents the three-dimensional volume within which primitives may need to be rendered for display. The top, left, bottom and right edge planes define a viewport (which typically corresponds to the size of the display screen), whilst near and far depth planes represent the front and back planes of the view frustum (representing the closest and furthest distances at which objects can appear).

As shown in FIG. 1, a guard band 20 can be provided around the view frustum 10 in order to reduce the amount of clipping required during initial geometry processing prior to rasterization and rendering. However, primitives that extend beyond the edges of the guard band would still need to be clipped. In order to avoid the requirement for such clipping, it is known to set the clipping area edge planes of the guard band to infinity, to effectively define an infinite guard band. This is done by setting the clipping area edges to the appropriate maximum full floating point number-format position values that can be represented and supported by the graphics processing system. The effect of this is then that no primitive can ever have defined for it a position that lies outside the clipping area edge planes and accordingly no clipping of the primitives needs to take place during the initial geometry processing stages. However, any primitives that lie exclusively within the guard band, and hence do not extend into the view frustum, can be culled during geometry processing, to reduce the amount of processing required during rasterization and rendering.

Figure 2:
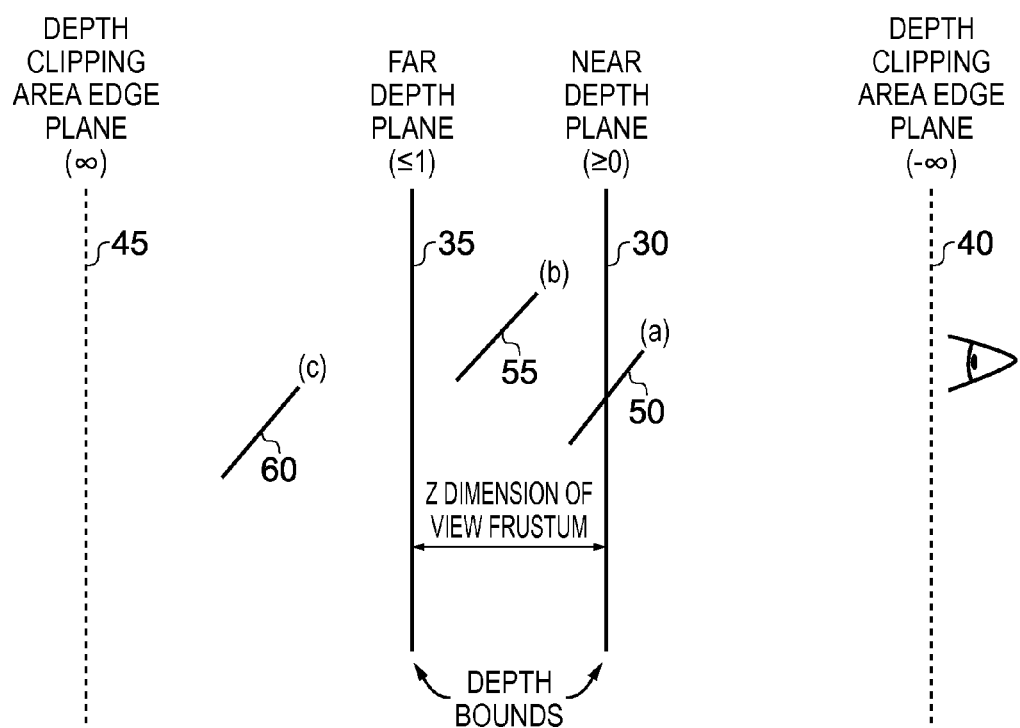
FIG. 2 schematically illustrates how different primitives are handled in accordance with one embodiment, dependent on their depth locations within the view frustum and/or guard band.

This is illustrated schematically by FIG. 2 in respect of the depth dimension Z. The near depth plane 30 of the view frustum will typically be defined to have a value greater than or equal to 0, whilst the far depth plane 35 of the view frustum will typically be defined to have a value less than or equal to 1. The depth clipping area edge planes 40, 45 of the guard band are in one embodiment effectively set to infinity, so that no primitive can have a value in the depth dimension which extends beyond those edge planes. As shown in FIG. 2, the depth equations calculated for each primitive will occupy a certain range of depth values within the depth dimension, and the depth equations 50, 55, 60 for three sample graphics primitives are illustrated schematically in FIG. 2.

The depth equation (b) 55 corresponds to a primitive that is entirely contained within the view frustum, and accordingly no action is required during geometry processing to clip or cull that primitive. The depth equation (a) 50 represents a primitive that is partially within the view frustum and partially outside the view frustum. However, because the depth clipping area edge planes of the guard band have been set to cover all possible values, no clipping of that primitive is required at the geometry processing stage, and instead the entire primitive can be forwarded to the primitive setup operation (also referred to herein as the triangle setup operation) performed prior to rasterization and rendering.

Conversely, the depth equation (c) 60 lies entirely within the guard band, and accordingly can be culled so that it is not forwarded on to the triangle setup operation.

Figure 3A:
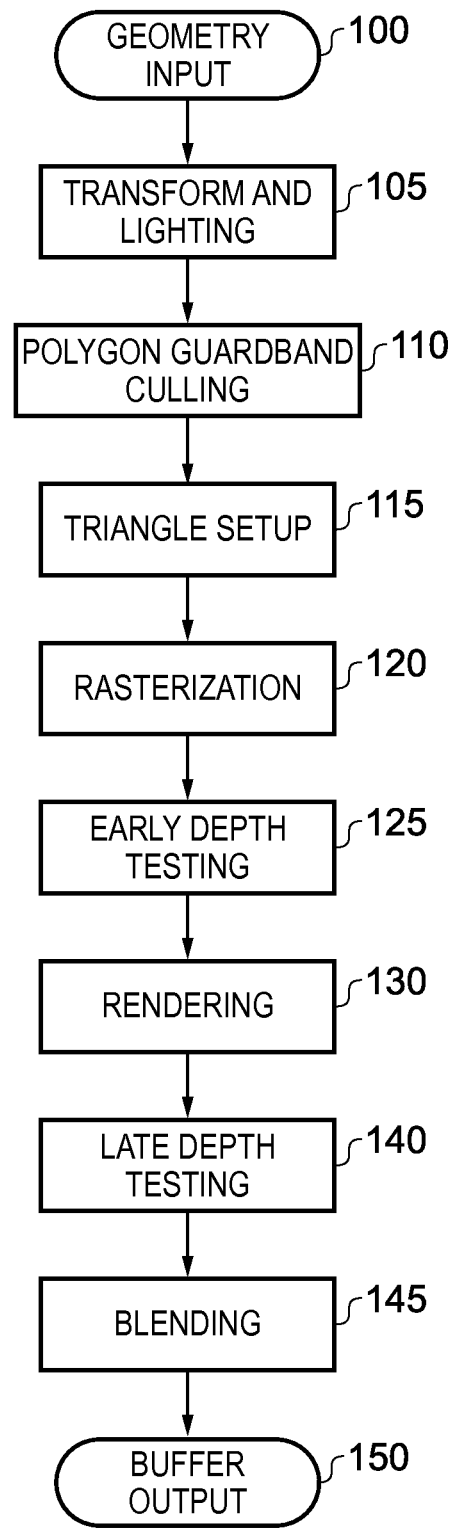
FIG. 3A schematically illustrates a sequence of steps performed in accordance with one embodiment when processing geometry input in order to generate an output for display.

FIG. 3A is a flow diagram illustrating steps performed within a graphics processing pipeline of a graphics processing unit in accordance with one embodiment. At step 100, geometry input is received, for each primitive this including an indication of the vertices that make up that primitive, and a number of data values representing the primitive at each vertex position, for example the X and Y position of the vertex, a depth (Z) value, colour and transparency values, etc.

At step 105, the geometry input is passed through a transform and lighting stage that receives the primitives and applies transformations and lighting effects to the primitives (or more particularly to the vertices that define the primitives), as is known in the art.

Following step 105, a polygon guard band culling stage 110 is performed where any primitives (also referred to herein as polygons) falling entirely within the guard band are culled. Hence, with reference to FIG. 2, it is at this stage that the primitive having the depth equation 60 will be culled. As mentioned earlier, no action will be taken here in connection with the primitive having the depth equation 50.

Following steps 110, if a primitive has not been culled at step 110 it will then be passed to the primitive setup stage 115 (referred to in FIG. 3A as the triangle setup stage since typically the triangle is the most common form of primitive). As discussed earlier, during the primitive setup stage the data defined for each vertex of the given primitive is used in order to determine a plurality of functions for that primitive, such as edge functions that represent the geometric edges of the primitive, and a depth function used to determine a depth value at any particular point within the primitive. Other functions may also be computed at this stage, such as interpolation functions that represent the way that the data values such as the colour values will vary across the primitive.

Following step 115, the primitive data, including the various functions computed by the triangle setup stage, are passed through the rasterization stage 120, where a rasterization operation is performed in order to determine a plurality of graphics fragments to be used to represent each graphics primitive. Each of the graphics fragments used to represent the graphics primitive will have associated X and Y positions. Following rasterization, the graphics fragments are then passed through the rendering stage 130, but optionally they may first be subjected to some early depth testing within the early depth testing stage 125. Depth testing is an operation used to determine, for each graphics fragment output by the rasterizing stage, a depth value for that graphics fragment using the depth function calculated during the triangle setup stage, and then to determine with reference to a Z-buffer value maintained for the position data associated with that graphics fragment whether that graphics fragment is to be displayed. In particular, for each X, Y position, the Z-buffer aims to keep track of the fragment that is closest to the viewer, and hence is the fragment that will need to be displayed.

In addition to depth testing, since clipping was avoided at the geometry processing stage, a depth bound clipping operation needs to be performed in order to discard any graphics fragments whose depth value does not reside within the valid depth range of the view frustum. Depth testing can be performed before or after shader invocation (part of the rendering stage 130). However, the performance of depth bound clipping is defined to be before shader invocation, but in common cases where there are no "side effects" it is safe to perform the depth bound clipping after shader invocation. Hence, for the common cases that have no side effects, both the depth bound clipping and the depth testing can be performed together, either during the early depth testing stage 125, or during the late depth testing stage 140. There is a performance advantage in performing both of these processes together, since it avoids the requirement to calculate the depth value twice, once for the depth bound clipping operation and once for the depth testing operation. It is a matter of design choice as to whether, for these common cases, both the depth bound clipping and the depth testing are performed during the early depth testing stage 125 or the late depth testing stage 140.

However, in cases where there are side effects, such as in situations where the rendering stage is required to write its output to memory, the depth bound clipping operation is required to take place before shader invocation and similarly the depth testing is required to occur after shader invocation. Accordingly, in those situations, the depth bound clipping operation can be configured to take place during stage 125, but depth testing can be configured to take place during stage 140. In one embodiment, as will be discussed later, in the presence of a predetermined condition the rasterization stage 120 can be configured to incorporate depth bound clipping (avoiding the need to perform it in the early or late depth test stages 125, 140), and where such side effects are present, performing the depth bound clipping within rasterization stage 125 can provide a particularly efficient approach.

During the rendering stage 130, the fragments from the rasterizer (as subjected to any early depth testing) are received, and various rendering operations are applied such as colouring operations, shading operations, etc. These processes will be applied by invoking one or more shader programs to perform the required operations on the graphic fragments.

The outputs from the rendering stage 130 are then passed through the late depth testing stage 140 where any late depth testing is performed as discussed earlier (late depth testing may not be required if early depth testing has been performed). The output is then passed through the blending circuitry 145, where any required blending operations are performed. In particular, if at a current X, Y position the graphics fragment that is identified in the Z-buffer as being closest to the viewer is not entirely opaque, then it will be necessary to blend properties such as the colour of that closest graphics fragment with the properties of one or more graphics fragments behind that closest graphics fragment. Following any blending operations required at stage 145, the resultant graphics fragment data representing the final form of the corresponding pixel to be displayed is stored in the output buffer at the buffer output stage 150.

Figure 3B:
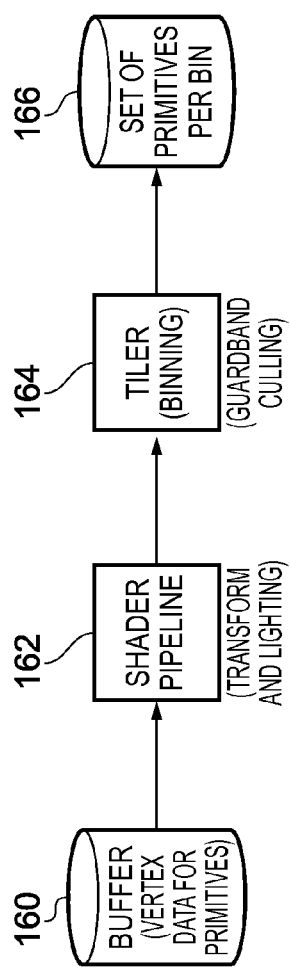
FIGS. 3B and 3C are block diagrams illustrating components that may be provided within a graphics processing system to implement the process of FIG. 3A in accordance with one embodiment.
Figure 3C:
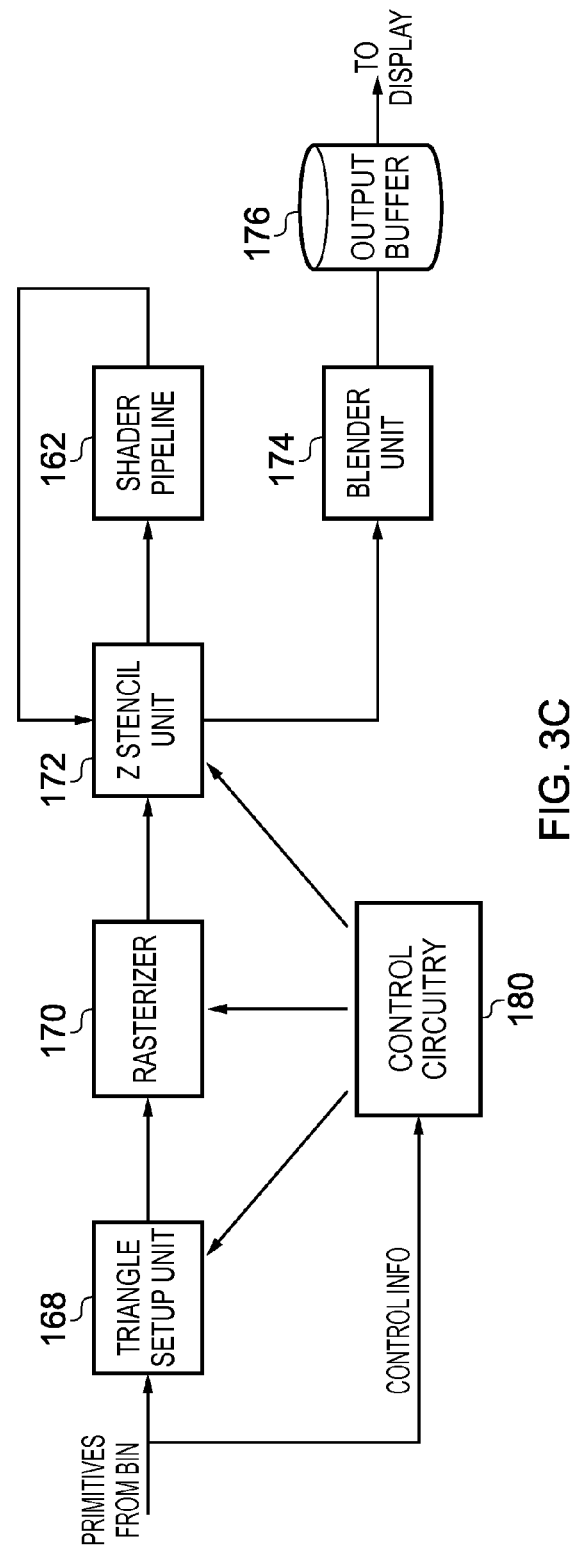

FIGS. 3B and 3C are block diagrams illustrating components provided within a graphics processing unit in accordance with one embodiment in order to implement the process of FIG. 3A. A buffer 160 containing the original vertex data for the primitives to be displayed is accessed by a shader pipeline 162 in order to perform the transform and lighting operations described earlier with reference to step 105 of FIG. 3A. Thereafter, the output from the shader pipeline is passed to a tiler unit 164 used to implement a binning operation. In accordance with tile-based rendering, rather than the entire scene effectively being processed in one go (as would be the case in so-called "immediate mode" graphics processing or rendering), the scene to be displayed is divided into a plurality of smaller sub-regions usually referred to as tiles. Each tile is rendered separately (typically one after another), and the rendered tiles are then recombined to provide the complete scene for display. In such arrangements, the scene is typically divided into regularly-sized and shaped sub-regions (tiles), for example squares or rectangles, but this is not essential. For a particular tile under consideration, the tiler unit 164 performs a binning operation in order to decide which primitives intersect the tile, and any primitive that intersects the tile is then placed in a "bin" for that tile. Accordingly, the output from the tiler 164 is a set of primitives per bin, which is stored within the buffer 166. The graphics processing unit is then arranged to process one tile at a time.

In particular, as shown in FIG. 3C, for a particular tile under consideration, the primitives from the associated bin will be forwarded to the triangle setup unit 168, which will perform the triangle setup operation described earlier with reference to step 115 of FIG. 3A, prior to outputting the resultant data to the rasterizer 170 where the rasterization operation described with reference to step 120 of FIG. 3A will be performed. The Z stencil unit 172 is then used to perform any early depth testing required by step 125 of FIG. 3A, before outputting the data to the shader pipeline 162 which is arranged to perform the rendering operations described with reference to step 130 of FIG. 3A. The output from the shader pipeline is then routed back through the Z stencil unit 172, where any late depth testing required by step 140 is performed, prior to the output then being routed to the blender unit 174 for any required blending operations. The output from the blender unit is then stored within the output buffer 176, prior to being combined with the output for other tiles in order to generate the scene for display.

As will be described in more detail later with reference to FIG. 4, control circuitry 180 is provided which receives certain control information associated with the primitives input to the triangle setup unit, and based on that control information determines the presence or absence of a predetermined condition. In the absence of the predetermined condition, the components operate exactly in the manner described earlier. However, in the presence of the predetermined condition, the control circuitry 180 is configured to disable the Z stencil unit 172 from performing any depth bound clipping operation, and instead the control circuitry modifies the operation of the triangle setup unit 168 and the rasterizer 170 in order to incorporate depth bound clipping within the rasterization operation. Hence, two alternative mechanisms are provided for depth bound clipping.

Whilst a tile-based approach is described above, it will be appreciated that the techniques discussed herein could equally be applied to other rendering techniques, for example the earlier-mentioned immediate mode rendering, where the entire scene is effectively processed in one go.

The process employed in one particular embodiment to provide the above-described two mechanisms for depth bound clipping will now be described further with reference to FIG. 4. Firstly at step 200, it is determined whether a new polygon has been retrieved from the buffer 166, and each time a new polygon (also referred to herein as a primitive) is retrieved from the buffer, the control circuitry analyses associated control information in order to determine at step 205 whether depth bias is enabled in respect of that polygon.

Figure 5:
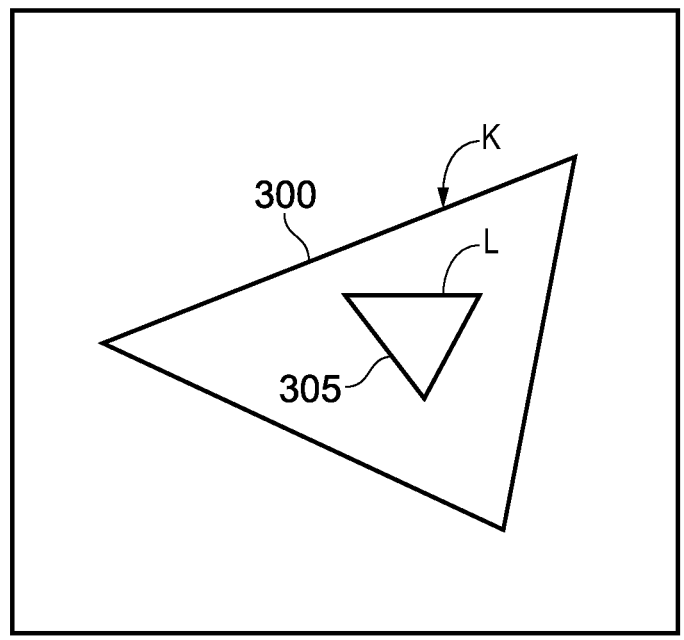
FIG. 5 is a diagram schematically illustrating depth bias.

FIG. 5 is a diagram schematically illustrating the purpose of enabling depth bias. In this example, it is assumed that a primitive K 300 does not have depth bias enabled, but the primitive L 305 does have depth bias enabled. By having depth bias enabled in respect of the primitive L 305, then even if both of the primitives 300 and 305 are at the same depth, this will ensure that primitive L 305 always appears on the surface of primitive K irrespective of the viewing angle. This is achieved irrespective of the order in which the primitives 300 and 305 are processed.

As mentioned earlier, depth bias will typically be enabled or disabled on a draw call by draw call basis, and hence will be enabled or disabled in respect of all of the primitives that are the subject of a particular draw call. If depth bias is not enabled, then the process branches to step 210 where the triangle setup unit 168 performs a standard triangle setup program to calculate the normal edge equations for the primitive, along with the depth (Z) equation required to calculate the depth value at any particular location within the primitive. Since depth bias was determined to have not been enabled at step 205, there is no depth bias information added to the depth equation at step 210.

Following step 210, the rasterizer 170 is arranged to perform the standard rasterization operation, checking the normal edge equations in order to determine whether any particular graphics fragment location is inside or outside the primitive. Those graphics fragments that are determined to be inside the primitive will form a plurality of graphics fragments used to represent the primitive. Each edge equation is typically arranged so that it will produce a positive value if the X and Y coordinates are inside the primitive and will produce a negative value if the X and Y coordinates are outside the primitive.

Following rasterization, then the Z stencil unit 172 will be arranged to perform the depth bound calculation, in order to determine whether any graphics fragments need culling or clamping, and will additionally perform depth testing as discussed earlier, both of these processes using the depth equation determined earlier at step 210 in order to calculate the depth value of any particular graphics fragment under consideration.

Figure 7A:
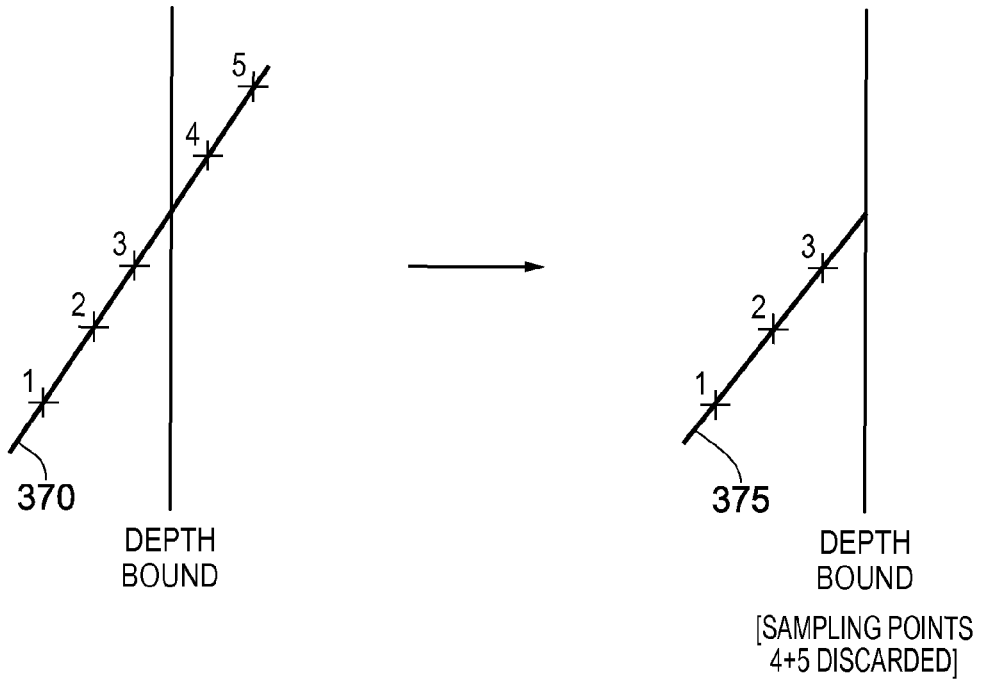
FIGS. 7A and 7B schematically illustrate culling of graphics fragments (in order to clip the graphics primitive represented by those graphics fragments) and clamping of graphics fragments, that may be performed in accordance with one embodiment.
Figure 7B:
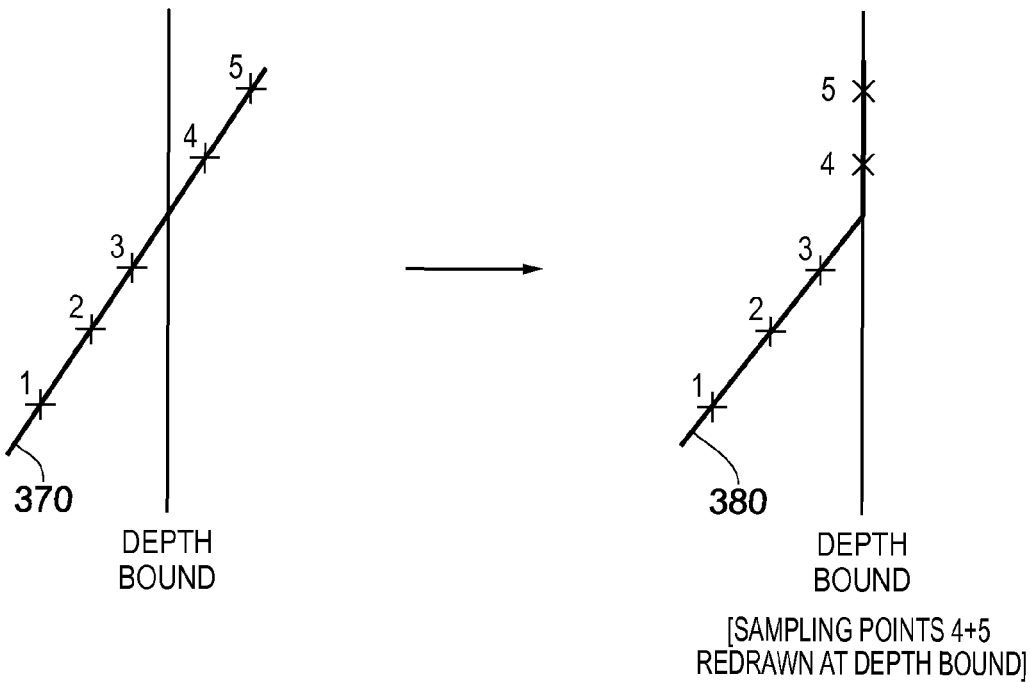

FIGS. 7A and 7B schematically illustrate culling and clamping operations that may be performed during the depth bound calculation at step 220. Assuming the depth bound operations are set to cull rather than clamp (typically this being set on a per draw call basis like the depth bias parameter), then culling will be performed as shown in FIG. 7A. In particular, each graphics fragment will be considered in order to determine whether it is within or outside the depth bound of the view frustum. In the example shown in FIG. 7A, the graphics fragments 4 and 5 will be determined to be outside the depth bound, and accordingly will be culled, but the graphics fragments 1, 2 and 3 will be retained since they are within the depth bound.

In one embodiment, each graphics fragment may include a plurality of sampling points within that graphics fragment, and in that scenario the culling processing can be applied on a sampling point by sampling point basis.

As will be seen from FIG. 7A, the performance of the culling operation effectively clips the primitive at the depth boundary and hence implements the depth bound clipping operation by selective culling of individual graphics fragments or sampling points of graphics fragments.

If instead the depth bound operations are set to clamp, then the process shown in FIG. 7B is performed. In particular, any graphics fragments, or sampling points within a graphics fragment, that are determined to be outside of the depth bound have their Z value modified to be coincident with the depth bound so that the associated part of the primitive is ultimately reproduced in alignment with the depth bound.

Figure 6:
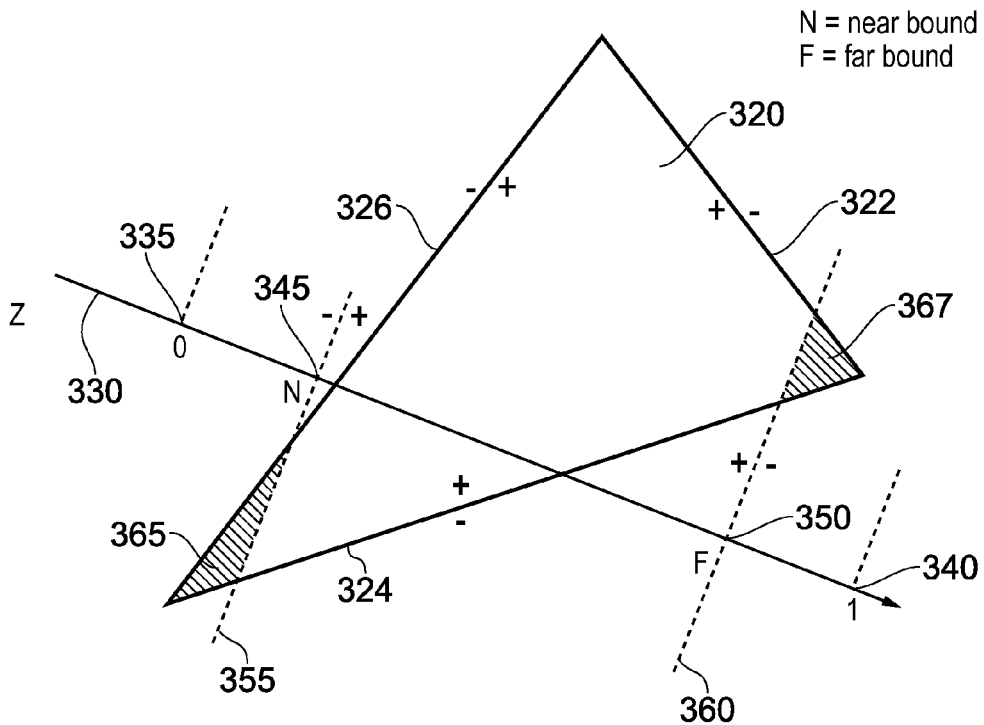
FIG. 6 is a diagram schematically illustrating how near depth plane and far depth plane edge equations may be computed in accordance with one embodiment, in order to allow depth bound clipping to be incorporated within the rasterization operation.

Returning to FIG. 4, if depth bias is determined to be enabled at step 205, then the process proceeds to step 225 where the control circuitry 180 modifies the operation of the triangle setup unit 168 so that it performs a longer triangle setup program. In particular, in addition to calculating the normal edge equations and the depth equation (in this case depth bias being added to the depth equation), the triangle setup unit 168 also calculates near depth plane and far depth plane edge equations. This process is illustrated in more detail with reference to FIG. 6. As shown in FIG. 6, for a primitive 320 the triangle setup program generates three edge equations 322, 324, 326 against which X, Y coordinates of graphics fragments can be evaluated in order to determine whether those graphics fragments are within the primitive or not. The depth equation is represented by the arrow 330, and has a value 0 at point 335 and a value of 1 at point 340. If the near depth plane of the view frustrum is selected to have a value of 0 and the far depth plane is selected to have a value of 1, then it will be appreciated that in this particular instance the entire primitive will be contained within the view frustum, and no clipping would be required. However, if as shown in FIG. 6, the near depth plane has a value N at point 345 on the depth equation, and the far depth plane has a value F at point 350 on the depth equation, then certain portions of the primitive 320 will reside outside of the view frustum. In accordance with step 225, the triangle setup program will create a corresponding near depth plane edge equation 355 and similarly will calculate a corresponding far depth plane edge equation 360. If the primitive only crosses one of the depth bounds then at step 225 it is actually only necessary to calculate one of the depth plane edge equations, and in one embodiment step 225 is modified accordingly to only generate the relevant one depth plane edge equation.

As shown in FIG. 6, the near depth plane edge equation and the far depth plane edge equation can be calculated using the depth equation computed as part of the standard triangle setup operation. In particular, the depth equation will have a parameter $c_z'$ which is a modified version of an original parameter $c_z$ as modified by the depth bias information, but the near and far depth plane edge equations can use the same $a_z$ and $b_z$ parameters of the depth equation, but with a replacement parameter for the $c_z$ parameter of the depth equation. In particular, in the near depth bound edge equation, a parameter $c_{NEAR}$ is computed by subtracting the near bound value N from the parameter $c_z$ (i.e. the original c parameter before it was modified by the depth bias). Similarly, the parameter $c_{FAR}$ can be calculated by subtracting the far bound value F from the original $c_z$ value. As mentioned earlier, the edge equations are typically computed so that they will produce a positive value if a particular set of X and Y coordinates are within the primitive, and a negative value if they are not, and this is the reason why the far depth plane edge equation involves subtractions rather than additions.

As will be discussed below with reference to the remainder of FIG. 4, when these additional edge equations are taken into account during the rasterization operation, this will prevent graphics fragments being allocated for those portions of the primitive that reside outside of the depth bounds of the view frustum.

In particular, returning to FIG. 4, once the modified triangle setup program has been performed at step 225, the process proceeds to step 230, where it is determined whether the near and far depth bound operations have been set to cull. If they have, then it is appropriate for the rasterization process to use all of the edge equations generated by the triangle setup program when deciding on the set of graphics fragments to be used to represent the primitive. Accordingly, at step 235, rasterization is performed using all of the edge equations, and considering the earlier discussed example of FIG. 6 this will result in no graphics fragments being produced for the sections 365, 367 of the primitive 320. As mentioned earlier, if the primitive only crosses one of the depth bounds, then in one embodiment step 225 can be arranged to only calculate the relevant one of the depth plane edge equations. In such an embodiment, at step 235 only the one depth plane edge equation calculated at step 225 will be used during rasterization (in addition to the normal edge equations).

If at step 230, it is determined that not both of the near and far depth bound operations have been set to cull, it is then determined at step 240 whether one of the near and far depth bound operations have been set to cull, and if so the rasterization operation is performed at step 245 for all the normal edge equations and for the one depth plane edge equation whose depth bound operation has been set to cull. Hence, for example, considering FIG. 6, if the near depth bound operation has been set to cull but the far depth bound operation has not, then this will result in no graphics fragments being generated for the portion 365, but graphics fragments will be generated for the portion 367. Considering the earlier mentioned embodiment where the primitive only crosses one of the depth bounds, and at step 225 only the relevant one of the depth plane edge equations is calculated, then at step 240 it can be determined whether, for the one of the near and far depth bound operations that is set to cull, whether the primitive crosses that depth bound, and only if that is the case will the process branch to step 245. Otherwise the process will proceed to step 250.

If at step 240 it is determined that neither the near depth bound operation or the far depth bound operation have been set to cull (or that for the one depth bound operation that has been set to cull the primitive does not cross that depth bound), then the process proceeds to step 250, where the rasterizer merely performs the normal rasterization operation using the standard edge equations.

Figure 4:
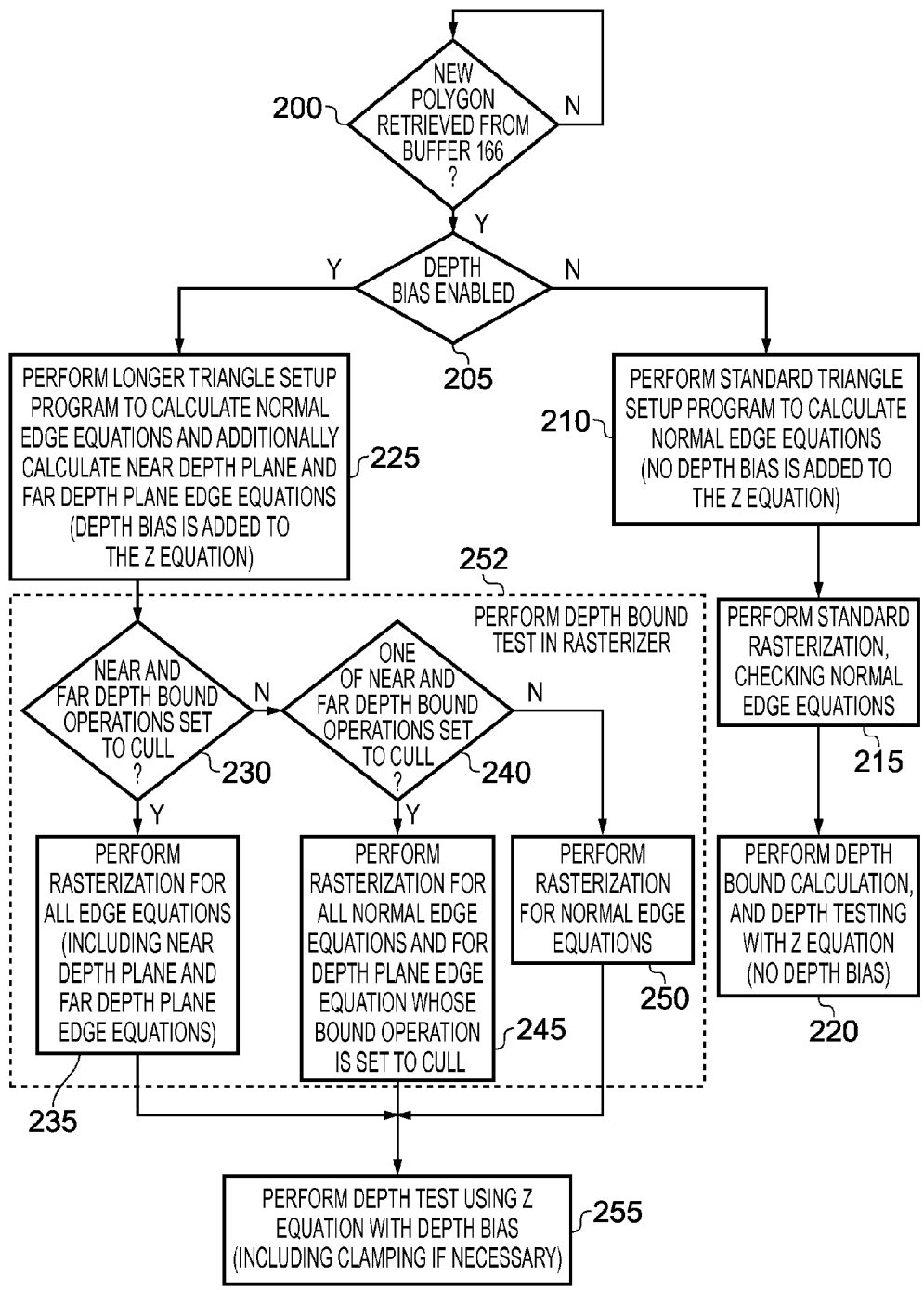
FIG. 4 is a flow diagram illustrating a process performed in accordance with one embodiment in order to select between two mechanisms for performing depth bound clipping.

As shown by the dotted box 252 of FIG. 4, the effect of the above described steps is that the rasterizer performs the depth bound clipping test directly, by virtue of the modified rasterization operation, and accordingly no depth bound clipping operation then needs to be performed by the Z stencil unit 172. Instead, when the Z stencil unit 172 receives the output from the rasterizer (for early depth testing) or the output from the shader pipeline (for late depth testing), it merely performs the depth test using the depth equation calculated at step 225, including the depth bias information. If any of the depth bound operations have been set to clamp rather than cull, then it will also perform any necessary depth clamping operations.

Whilst when describing above the sequence of steps shown by the dotted box 252, it was described that the rasterizer would use the relevant near depth plane and/or far depth plane edge equations when performing rasterization assuming the appropriate depth bound operations have been set to cull, in one embodiment, for a particular graphics primitive under consideration, the rasterizer can determine from the vertex depth information of the primitive whether the entire primitive is within the valid depth range of the view frustum, i.e. is within the near and far depth bounds, and if it is fully enclosed within the near and far depth bounds, the additional edge equations do not need to be used, and instead the standard rasterization of step 250 can be performed. This enables a performance improvement to be achieved for any graphics primitives where prima facie it is clear that no clipping will be required.

Figure 8:
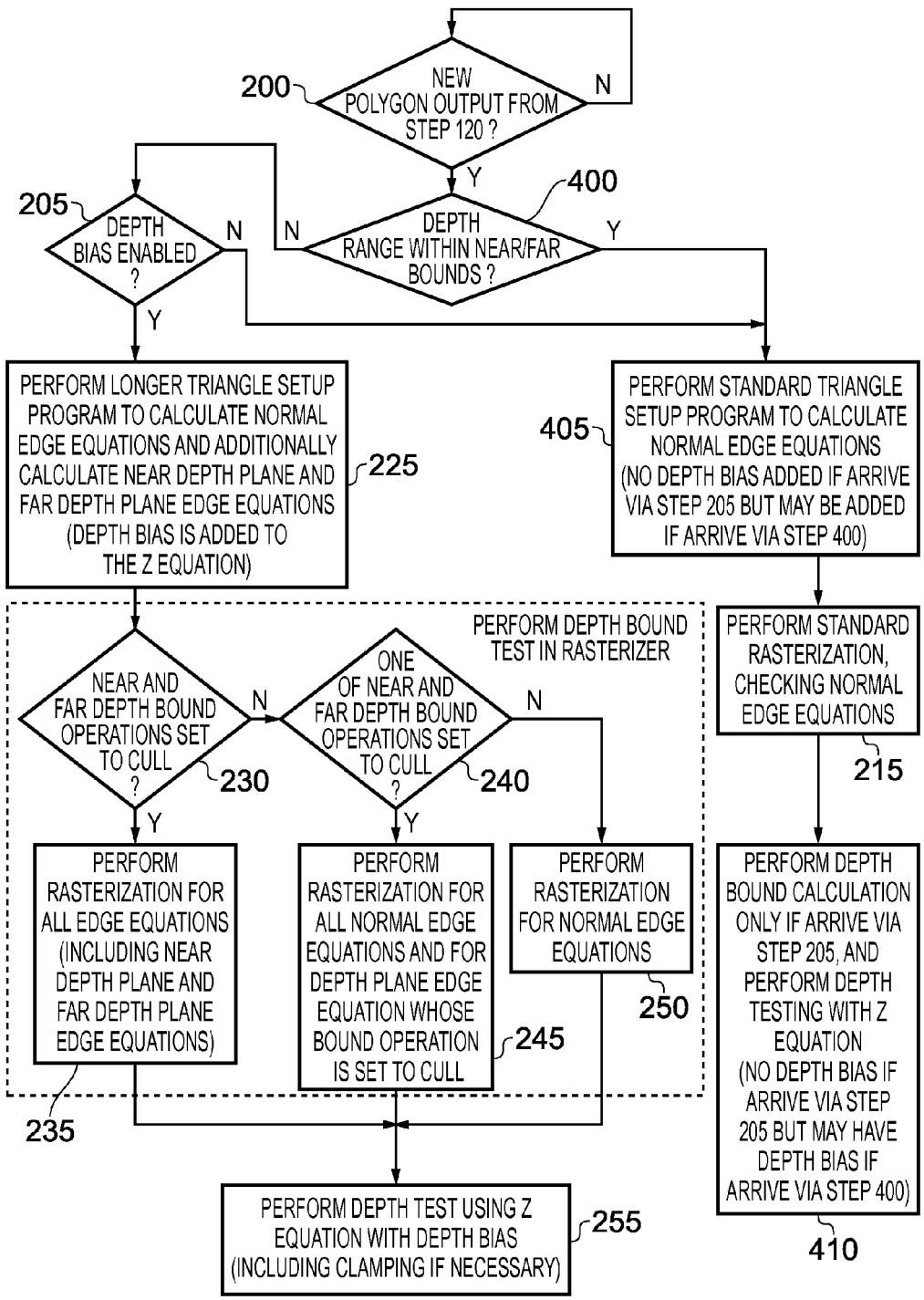
FIG. 8 is a flow diagram illustrating a process performed in accordance with an alternative embodiment (a variation of FIG. 4) in order to select between the two mechanisms for performing depth bound clipping.

FIG. 8 is a flow diagram illustrating a process that may be performed in accordance with an alternative embodiment, this being a slightly modified version of the approach described with reference to FIG. 4. Those steps that are identical to FIG. 4 use the same reference numerals, and will not be described further herein. As can be seen from FIG. 8, following step 200, an initial check 400 is performed before proceeding to step 205. In particular, at step 400 it is determined whether the depth range of the polygon currently being considered is within the near and far bounds of the view frustum. This check can readily be performed by looking at the vertex data for the polygon, and if all of the vertices have depth values which are within the near and far depth bounds, then it can be ensured that the entire polygon will be within the depth bounds. In that scenario, the process proceeds directly to step 405 irrespective of whether depth bias is enabled or not. However, if the depth range of the polygon is not entirely within the near and the far bounds, then the process proceeds to step 205 where it is checked whether depth bias is enabled or not. If depth bias is determined to be enabled at step 205, then the process proceeds exactly as discussed earlier with reference to FIG. 4.

If at step 400 it is determined that the depth range is within the near or far bounds, then the process proceeds to step 405, where the standard triangle setup program is performed to calculate the normal edge equations. As shown in FIG. 8, it is also possible to arrive at step 405 via step 205, and if step 405 is performed following step 205, then no depth bias information will be added to the depth equation. However, if step 405 is performed following step 400, then it may or may not be necessary to add depth bias to the depth equation, depending on whether depth bias is enabled or not.

Following step 405, step 215 is performed in exactly the same way as discussed earlier in FIG. 4. Following step 215, the process returns to step 410, where the depth bound calculation is only performed if step 410 is arrived at following performance of step 205. If instead, it is arrived at following the yes branch of step 400, then it is known that there will not be any clipping or clamping required, and accordingly the depth bound calculation can be omitted. Irrespective of whether step 410 is reached via step 400 or step 205, at step 410 depth testing will be performed using the depth equation. As discussed earlier that depth equation will have no depth bias added if the process has been arrived at via step 205, but may have depth bias if the process has been arrived at via step 400.

The approach of FIG. 8 will enable more primitives to be processed via the right hand side path than is the case when using the approach of FIG. 4, and hence the performance hit that is required when modifying the rasterization operation in order to perform depth bound testing can be limited to a reduced subset of the primitives.

As will be apparent from the above discussion, the described embodiments provide two separate mechanisms for performing depth bound clipping, with the switching between those mechanisms occurring dynamically dependent on the presence or absence of a predetermined condition. Such an approach enables the apparatus to maintain high performance whilst reducing the area and power consumption requirements of the apparatus.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An apparatus for processing graphics primitives for display, comprising:
   primitive setup circuitry configured to determine a plurality of functions for an input graphics primitive, including an edge function associated with each edge of the input graphics primitive and a depth function associated with the input graphics primitive;
   rasterization circuitry configured to perform a rasterization operation using the edge function associated with each edge of the input graphics primitive in order to calculate position data for a plurality of graphics fragments to be used to represent the input graphics primitive;
   depth bound clipping circuitry configured in a default mode of operation to perform a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range; and control circuitry configured to be responsive to detection of a predetermined condition to modify the operation of the primitive setup circuitry and the rasterization circuitry for one or more input graphics primitives in order to incorporate depth bound clipping within the rasterization operation performed by the rasterization circuitry for said one or more input graphics primitives, the control circuitry further being configured on detection of said predetermined condition to disable the default mode of operation in order to disable the depth bound clipping circuitry from performing said depth bound clipping operation;

wherein:

the control circuitry is configured to modify the operation of the primitive setup circuitry by causing the primitive setup circuitry to additionally determine at least one depth plane edge function for the input graphics primitive; and the control circuitry is configured to modify the operation of the rasterization circuitry by causing the rasterization circuitry to incorporate said at least one depth plane edge function in said rasterization operation.

2. An apparatus as claimed in claim 1, wherein said at least one depth plane edge function is determined using said depth function and an indication of the valid depth range of the view frustum.

3. An apparatus as claimed in claim 1, wherein said at least one depth plane edge function comprises a near depth plane edge function and a far depth plane edge function.

4. An apparatus as claimed in claim 1, wherein the rasterization circuitry is configured not to incorporate said at least one depth plane edge function in said rasterization operation if the depth range of the input graphics primitive lies within a depth bound of said at least one depth plane edge function.

5. An apparatus as claimed in claim 1, wherein said predetermined condition that causes the control circuitry to modify the operation of the primitive setup circuitry and the rasterization circuitry for one or more input graphics primitives is a condition indicating that a depth bias is enabled for said one or more input graphics primitives.

6. An apparatus as claimed in claim 5, wherein said control circuitry is configured to determine, for each input graphics primitive, whether the depth range of that input graphics primitive lies within the valid depth range of the view frustum, and only if it does not is the control circuitry then configured to modify the operation of the primitive setup circuitry and the rasterization circuitry for that input graphics primitive if the depth bias is enabled.

7. An apparatus as claimed in claim 6, wherein if the control circuitry determines that the depth range of the input graphics primitive lies within the valid depth range of the view frustum, the control circuitry is further configured to disable the default mode of operation in order to disable the depth bound clipping circuitry from performing said depth bound clipping operation.

8. An apparatus as claimed in claim 1, wherein the depth bound clipping circuitry is further configured to perform a depth testing operation by determining, for each graphics fragment in said plurality of graphics fragments, the depth value for said graphics fragment using the depth function, and determining with reference to a Z-buffer value maintained for the position data associated with that graphics fragment whether that graphics fragment is to be displayed.

9. An apparatus as claimed in claim 8, wherein, in said default mode of operation, the depth bound clipping circuitry is configured to selectively perform said depth bound clipping operation and said depth testing operation together, so that the depth value is only calculated once per graphics fragment and then used for both said depth bound clipping operation and said depth testing operation.

10. A method of operating an apparatus to process graphics primitives for display, comprising:

performing, by primitive setup circuitry a primitive setup operation to determine a plurality of functions for an input graphics primitive, including an edge function associated with each edge of the input graphics primitive and a depth function associated with the input graphics primitive;

performing, by rasterization circuitry, a rasterization operation using the edge function associated with each edge of the input graphics primitive in order to calculate position data for a plurality of graphics fragments to be used to represent the input graphics primitive;

in a default mode of operation, depth bound clipping circuitry performing a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range; and responsive to detection of a predetermined condition, control circuitry modifying the primitive setup operation and the rasterization operation for one or more input graphics primitives in order to incorporate depth bound clipping within the rasterization operation for said one or more input graphics primitives, and disabling the default mode of operation in order to disable the depth bound clipping operation;

the modifying of the primitive setup operation causing the primitive setup operation to additionally determine at least one depth plane edge function for the input graphics primitive; and the modifying of the rasterization operation causing the rasterization operation to incorporate said at least one depth plane edge function in said rasterization operation.

11. An apparatus for processing graphics primitives for display, comprising:

primitive setup means for determining a plurality of functions for an input graphics primitive, including an edge function associated with each edge of the input graphics primitive and a depth function associated with the input graphics primitive;

rasterization means for performing a rasterization operation using the edge function associated with each edge of the input graphics primitive in order to calculate position data for a plurality of graphics fragments to be used to represent the input graphics primitive;

depth bound clipping means for performing, in a default mode of operation, a depth bound clipping operation by determining, for each graphics fragment in said plurality of graphics fragments, a depth value for said graphics fragment using the depth function, and determining whether said depth value resides within a valid depth range of a view frustum, the graphics fragment being discarded from further processing if its depth value does not reside within said valid depth range; and control means for modifying, in response to detection of a predetermined condition, the operation of the primitive setup means and the rasterization means for one or more input graphics primitives in order to incorporate depth bound clipping within the rasterization operation performed by the rasterization means for said one or more input graphics primitives, the control means further for disabling, on detection of said predetermined condition, the default mode of operation in order to disable the depth bound clipping means from performing said depth bound clipping operation;

wherein:

the control means modifies the operation of the primitive setup means by causing the primitive setup means to additionally determine at least one depth plane edge function for the input graphics primitive; and the control means modifies the operation of the rasterization means by causing the rasterization means to incorporate said at least one depth plane edge function in said rasterization operation.

* * * * *